Sept. 6, 1938.  E. L. WOOD  2,129,188
FILTER
Original Filed Sept. 2, 1933
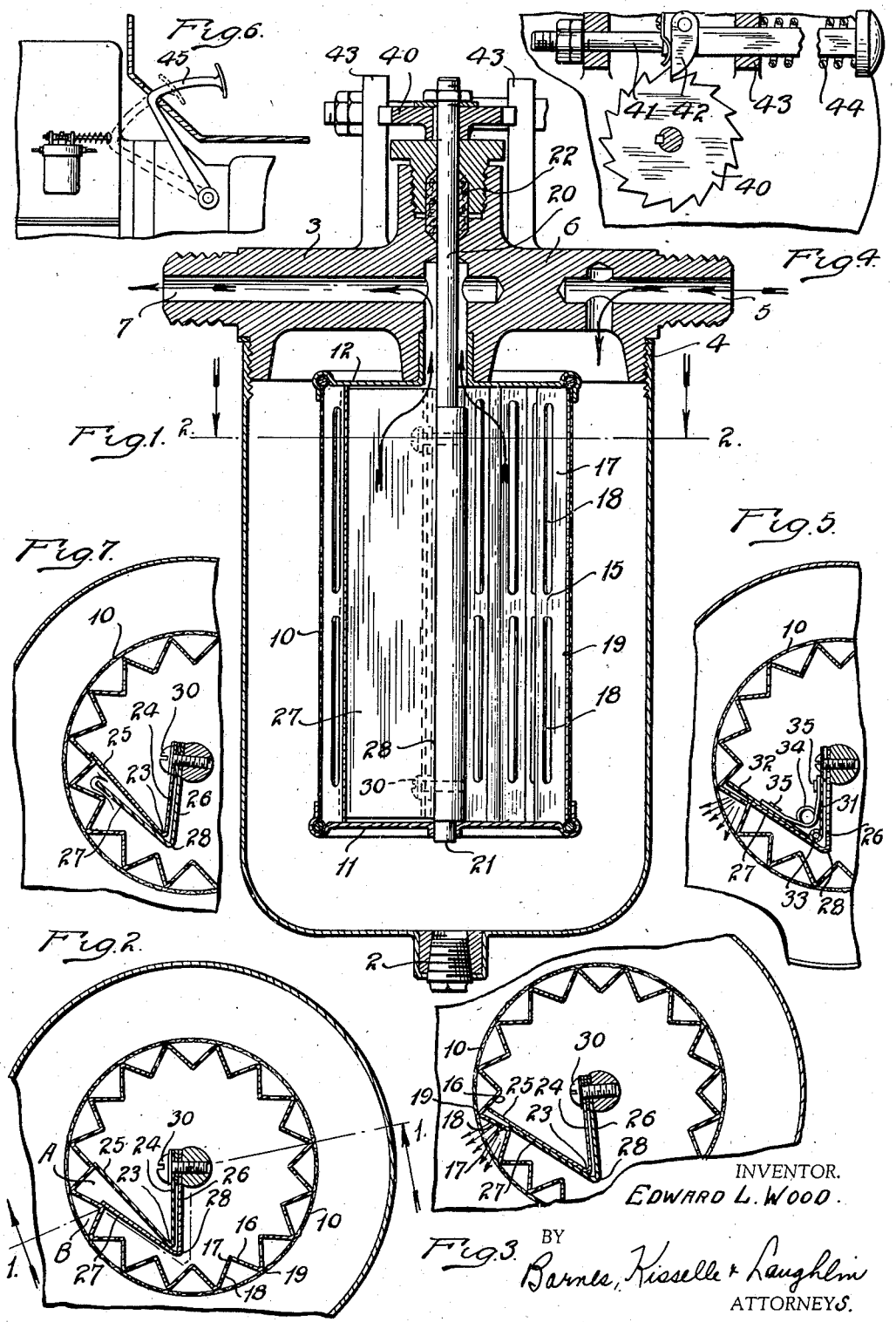
INVENTOR.
EDWARD L. WOOD.
BY
Barnes, Kisselle & Laughlin
ATTORNEYS.

Patented Sept. 6, 1938

2,129,188

UNITED STATES PATENT OFFICE 2,129,188

FILTER

Edward L. Wood, Detroit, Mich.

Application September 2, 1933, Serial No. 687,965
Renewed May 2, 1936

9 Claims. (Cl. 210—167)

This invention has to do with a filter for filtering fluids, and it is concerned particularly with the provision of a filter useful in connection with oil, water, or gases, and liquid fuel such as gasoline, fuel oil, or the like.

One of the principal objects of the invention is the provision of a filter in which the filtering medium may be cleansed, from time to time, or with a more or less continuous action, as elected, and the sediment or other extraneous matter removed from the medium. It is the aim of the invention to provide a filter structure capable of use over an indefinite period of time. To this end, the filter embodies an arrangement of parts for cleaning the filtering medium in situ. In other words, the filtering medium may be cleaned or may be maintained cleaned, if a more or less continuous action is desired, without involving the necessity of taking the filter apart. Moreover the invention contemplates a filter structure in which a portion of the filtering medium may be cleaned while the filter is actually in use, and to this end certain instrumentalities are provided, which, upon actuation, are effective for producing a cleansing action on a portion only of the filtering medium, so as to cleanse this portion leaving the other portions of the filtering medium to perform their normal function. Thus there is no great turbulence or stirring up of a large quantity of sediment or extraneous matter which might impair the operation of the filter.

The invention may be carried out by providing a filtering medium in the form of a screen or other body provided with a multiplicity of interstices, and associating with this filtering medium an element which serves to divide off portions of the filtering medium from other portions thereof, and providing actuated parts arranged to forcefully pass fluid through one or more of the divided off portions of the filtering medium in a direction reverse to that of the normal flow of fluid through the filter.

With this general statement of the invention in mind the detailed description may be followed, in which further objects of the invention will appear, and reference may be made to the accompanying drawing.

Fig. 1 is a vertical sectional view taken through a filter constructed in accordance with the invention.

Fig. 2 is a sectional view taken substantially on line 2—2 of Fig. 1 showing the elements for producing the cleansing force in one position which they may assume.

Fig. 3 is a view similar to Fig. 2 showing such elements in another position.

Fig. 4 is a view illustrating one arrangement which may be used for operating the cleansing elements.

Fig. 5 is a sectional view similar to Fig. 2 showing a modified form of the invention.

Fig. 6 is a more or less diagrammatic view exemplifying one way in which the filter may be used and operated.

Fig. 7 is a detailed view showing the action of some parts.

The filter may comprise a chamber made up of a shell 1 which may have a drain plug 2 in the bottom thereof, and a top or closure member 3 to which the shell 1 may be connected as by means of screw threads 4. The top member 3 may be a casting or die casting formed with an inlet passageway 5 for fluid, a central passageway 6 connecting into an outlet passage 7.

Within the chamber there is disposed the filtering medium. This medium may take the form of a screen or other body having a multiplicity of interstices, of substantially cylindrical shape, which filtering element is illustrated at 10 closed at its ends by plates 11 and 12. The fluid entering the passageway 5 passes into the shell 1 around the filtering medium, thence through the medium 10, into the passageway 6 and out the passageway 7. The filtering agent 10 may be of such fineness as is desired although the interstices may be particularly small when used with the cleansing arrangement now to be described.

Within the cylindrically shaped screen there is disposed an element 15. This element may be of sheet metal or other suitable material and is preferably in the form of an open ended cylinder with its ends preferably substantially abutting against the end plates 11 and 12. The walls of this member 15 are undulated or corrugated; while the ridges and their furrows as shown herein are quite sharp, yet for the lack of a better term, the word corrugate may apply. Looking at the member from the outside, each furrow is defined by a solid wall 16 and a wall 17 provided with one or more apertures 18. The ridges 19 substantially abut against the inside of the filtering medium. Thus there are a plurality of separate portions of the filtering medium divided from each other by the contact line of the ridges.

A center post 20 may extend substantially through the cylindrical form of the filter and may be journaled as at 21 in the plate 11 and extend out through the top member 3, preferably through a packing gland 22. Secured to this post in any suitable manner are pressure creating elements, one of which may take the form of a piece of sheet metal of spring nature with a bend line therein as at 23 separating a portion 24 and a portion 25. The other member may be of similar sheet metal similarly shaped with portions 26 and 27 defined by a bend line 28. These two members extend substantially from the plate 11 to the plate 12, and portions 24 and 26 are secured to the center post 22 as by means of one or more screws 30. The ends of the portions 25 and 27 are arranged to wipe against the inside of the corrugated walls of the element 15 and, as shown in Fig. 3, portion 25 is longer than the portion 27 and the portion 27 constitutes a sealing member, as will later appear.

In the modified form, one of the members may be made up of two pieces as illustrated at 31 and 32 hinged together as at 33, and a torsion spring 34 may have its opposite ends secured to the portions 31 and 33 as by means of struck out lugs 35.

The center post is designed to be rotated advantageously with step by step movement. This may be done by hand by means of any suitable element fastened to the post on the outside of the chamber, or it may be done mechanically in any suitable manner. One example is to attach to the upper end of the post 22 a ratchet wheel 40 which may be operated by any suitable agency, an example of which is a reciprocating plunger 41 carrying a spring pressed pawl 42 and mounted in brackets 43 which may be carried by the casting 3. A coil spring 44 may hold the plunger in the position shown in Fig. 4. When the filter is to be used on an automotive vehicle the plunger may be associated with some other moving element so that the plunger is actuated from time to time, and as exemplary of this arrangement there is shown in Fig. 6 a foot pedal 45 which may be the brake pedal or clutch pedal and which is arranged to engage the end of the plunger 41 and actuate the same against the action of the spring 44. Thus, each time the pedal 45 is moved the center post 20 is rocked.

The device may be used wherever it is desirable to filter a fluid and it is believed that one large use is for filtering oil of internal combustion engines. In such a case, the oil flows by pump action through the passageway 5 and into the shell around the filtering element, through the screen and out the passageways 6 and 7. The cleaner may be used on any other machine where there is a flow of oil as for example on such machines as lathes, grinding machines, and the like. It may be used to filter the fuel oil of any oil burning device as for example, the well-known oil burners of household furnaces; it may be used to filter the water which is to be sprayed through jets in air conditioning devices.

The cleaning of the filtering element may take place as follows: The normal position of the members which wipe against the corrugated part of the insert member may be the position shown in Fig. 3 with the part 27 lying up against a wall 17 of one of the corrugations and with part 25 substantially abutting part 27. Upon turning the center shaft counterclockwise as Figs. 2, 3, 5, and 7 are viewed, the portion 27 is moved off of said engaged side of a corrugation. The portion 27 may be slightly tensioned to move off of the portion of the corrugation and preferably it moves with the center shaft so that the end of the part 27 moves from the position shown in Fig. 2 to the position shown in Fig. 3 with a fairly slow movement, an intermediate position being illustrated in Fig. 7. It will be noted by referring to Fig. 7 how the fluid may flow around the part 27 thus filling the compartment A. This arrangement of permitting the fluid to fill the compartment A by flowing around the member 27 with its fairly slow movement minimizes any tendency to draw fluid rapidly through that portion of the medium defining the chamber B, as would be the case if the member 27 moved quickly from the Fig. 2 position to the Fig. 3 position thereby creating a vacuum in compartment A. After the part 27 assumes the Fig. 3 position it clears some or all of the apertures 18 so as to leave them open and there is thus formed the chamber A. This chamber is substantially sealed by the parts 25 and 27 and end plates 11 and 12 and one wall 16 of the corrugation, but the openings 18 are substantially unrestricted and they communicate into the chamber B defined by the sides 17 and 16 of a corrugation and a portion of the medium 10. Upon continued movement of the center post, portion 25 is placed under tension and it is ultimately freed from the wall 17. The arrangement is preferably such that the member 25 is placed under such a tension and is constructed of metal having such spring action as to move quickly with a snap action from the Fig. 2 position to the Fig. 3 position during which movement the extreme end of the member 25 takes a path of movement very close to the wall 16. This quickly collapses the chamber A and forces the entrapped liquid out of the chamber A and most of the liquid is forced through the apertures 18 into the chamber B and through the portion of the filtering element which defines one side of the chamber B. At this time the member 27 substantially seals against the bottom of a furrow adjacent the furrow over which the plate 25 snaps. At this point the difference in the actions between the members 27 and 25 may be emphasized; the member 27 preferably does not have a snapping action but is only slightly tensioned as it moves off of a high point of the corrugation, so that it has a relatively slow movement with the center shaft to readily permit the liquid to fill in behind the same as the compartment A is being formed; member 25 has a very quick action to force the fluid out of the compartment and through the adjacent portion of the medium. Thus the liquid is forcefully ejected through this portion of the filtering element in a direction reverse to that of the normal flow of liquid therethrough as illustrated by the arrows in Fig. 3. This forceful ejection or movement of the liquid with reverse flow removes sediment and particles which have been collected on this portion of the filtering element and the particles are thrown back into the body of liquid in the shell and the particles may fall to the bottom thereof. The shell may be drained from time to time by means of the drain plug 2.

It is to be noted that only a small portion of the filtering element may be cleaned at any one time, particularly if the amount of rotation given to the center post is just enough to move the force producing elements 25 and 27 from one corrugation to another, and the result is that there is no great turbulence or disturbance of the sediment. The liquid may be flowing through the filter at the time this action takes place, as all of the filtering element is providing filtering action except that portion defining the chamber B. It is, of course, within the invention to use more than one set of force producing elements so as to clean more than one section at a time.

An automatic cleaning action may be obtained by associating the center post operably with some other moving part of any mechanism with which the filter is associated. Such a part may be the clutch pedal, brake pedal, as above described, or the starter or other mechanism in an automatic vehicle, and the particular element with which the filter may be so associated depends somewhat upon the desired frequency of the cleaning action. When the filter is so associated in an automotive vehicle it may be used indefinitely without replacement, and all that is required is to drain off the sediment from time to time. It is within the invention to move the center post mechanically or by hand a distance greater than that from one corrugation to another in each operation. When the device is used with a fuel oil burner it may be operatably associated with parts which move when the burner is turned on and shut off. In the modified form shown in Fig. 5 the torsion spring 34 produces the force for collapsing the chamber with the entrapped liquid and the strength of the spring may be such as to give a desired action.

An important item in the arrangement is the relation between the shape of the corrugations of the member 15 and the pivot point for the member 25. This should be such that the end of the member 25 in moving from the Fig. 2 position to the Fig. 3 position moves in a path which is very close to the wall 16 so that the end of the member 25 practically seals against the wall, so that the fluid may not readily flow between these two parts as the compartment A is collapsed. One way of doing this with the form shown herein is to place the bend line 23 or the pivot point 33 off center as regards the center post 20. This position may vary with the variation in the shape of the corrugations.

I claim:

1. A filter comprising, a substantially cylindrically shaped filtering medium, means closing the ends of the cylindrical form, a member having substantially corrugated walls disposed within the cylindrical form and having its ridges substantially contacting with the medium and extending substantially from end to end of the cylindrical form, the successive furrows forming chambers each defined in part by successive portions of the medium and some of the walls of the furrows having apertures therein, the normal flow of liquid being from the outside of the medium to the inside thereof, and means for forcing liquid with reverse direction of flow into successive chambers and through successive portions of the medium, said last named means comprising rotatable spring acting plates adapted upon rotation to substantially seal one against the bottom of a furrow and another against the bottom of an adjacent furrow, whereby they are separated to form a compartment, and adapted to collapse upon further rotation to force liquid out of said compartment through the said apertures.

2. A filter comprising, a filtering medium of cylindrical form, means closing the ends of the cylindrical form, a corrugate member disposed within the filtering medium and having ridges substantially contacting therewith, one wall of each furrow having one or more apertures therein, a rotatable post substantially on the axis of the cylinder, and a pair of spring actuated plates secured to the post and arranged to wipe the corrugate walls upon rotation thereof.

3. A filter comprising, a cylindrically shaped filtering medium, means closing the ends of the cylindrical form, a corrugate member disposed within the cylindrical form and having ridges substantially contacting therewith, one wall of each furrow having one or more apertures therein, a rotatable post substantially on the axis of the cylinder, and a pair of spring actuated plates secured to the post and arranged to wipe the corrugate walls upon rotation thereof, one of said plates being relatively short and the other being relatively long, whereby one moves off of one high point of the corrugated wall before the other so that the plates are separated and define a compartment therebetween, said compartment communicating through the apertures in a furrow wall into said furrow.

4. A filter comprising, a cylindrically shaped filtering medium, means closing the ends of the cylindrical form, a corrugate member disposed within the cylindrical form and having ridges substantially contacting therewith, one wall of each furrow having one or more apertures therein, a rotatable post substantially on the axis of the cylinder, and a pair of spring actuated plates secured to the post and arranged to wipe the corrugate walls upon rotation thereof, one of said plates being relatively short and the other being relatively long, whereby one moves off of one high point of the corrugated wall before the other so that the plates are separated and define a compartment therebetween, said compartment communicating through the apertures in a furrow wall into said furrow, whereby upon further rotation the longer plate moves off a high point and by spring action collapses the compartment to force fluid through said apertures, furrow, and through the adjacent portion of the filtering medium.

5. A filter comprising, a filtering medium of cylindrical shape closed at its ends and through which liquid may flow from the outside to the inside for filtering purposes, a member within the medium having substantially corrugated walls with its ridges substantially contacting with the medium and its furrows spaced therefrom to form chambers, one wall of each furrow having one or more apertures therein, a rotatable post axially disposed in the medium, a spring acting plate carried by the post for wiping the inner surface of the corrugate member, another spring acting plate for wiping the inner surface of the corrugate member, said plates having different widths so that one moves over a high point before the other, whereby the plates separate and a compartment is formed which is defined by the plates and two adjacent walls of the corrugate member, said compartment being in communication with the apertures in one of the walls, whereby said compartment is collapsed as the wider of said plates passes over a high point and liquid is forced through the apertures into an adjacent furrow and through a portion of the filtering medium, with the direction of flow reverse to that of the normal flow therethrough.

6. A filter, comprising a filtering medium having a multiplicity of interstices, a member of substantially corrugate form disposed on one side of the filtering medium with ridges of the corrugate form substantially contacting therewith, one wall of each furrow of the corrugate form having one or more apertures therein, a pair of spring actuated plates having end portions arranged to contact with the corrugate member, one of said plates being relatively short and the other being relatively long, means for causing relative movement between the corrugate member and the plates whereby the plates wipe the corrugate member and move off of one high point and over against the next adjacent wall with a snap action, the relatively short plate moving off of a given high point before the relatively long plate whereby the plates are separated and define a compartment therebetween which communicates through the one or more apertures in a wall into a furrow, said compartment being collapsed by the snap action of the relatively long plate upon continued relative movement whereby fluid is forced out of the compartment and through the interstices of the adjacent portion of the filtering medium.

7. A filter for liquids comprising, a filtering medium through which the liquid flows, a sealing member, a spring actuated forcing member adjacent the sealing member, both of said members being on the outgoing side of the medium, movable means for causing said members to substantially traverse the medium, means in the path of the forcing member for successively flexing the same in its traversing movement and past which the forcing member moves substantially with a snap-like action, said forcing member, when so released, moving toward the sealing member whereby to substantially collapse the space therebetween and force some of the liquid trapped therebetween through the portion of the medium adjacent said members in a direction reverse to the normal flow of liquid through the medium.

8. A filter for liquids comprising, a filtering medium through which the liquid flows, a sealing member, a spring-acting forcing member, both positioned on the outgoing side of the medium, movable means for causing said members to substantially traverse the medium, a series of wall-like members projecting from the medium on the outgoing side thereof, said sealing member successively substantially sealing against said wall members, said forcing member contacting with and being successively flexed away from the sealing member by the wall-like members, said forcing member moving past the wall members with spring action and toward the sealing member to substantially collapse the space therebetween to force some of the liquid trapped therebetween through a portion of the medium in a direction reverse to the normal flow of liquid therethrough.

9. A filter for liquids comprising, a filtering medium through which liquid flows, a series of spaced wall-like members on the outgoing side of the filtering medium substantially dividing the filtering medium into sections, a spring-acting forcing member on the outgoing side of the filtering medium, means for causing relative movement between the filtering medium and the forcing member, whereby the forcing member substantially traverses the filtering medium, said forcing member successively engaging and being flexed away from the filtering medium by the wall-like members and successively released thereby whereby the forcing member successively moves with snap-like action toward the filtering medium to force a quantity of said liquid through successive sections of the filtering medium in a direction reverse to the normal flow of said fluid through the medium.

EDWARD L. WOOD.